United States Patent [19]

Young et al.

[11] Patent Number: 5,190,111
[45] Date of Patent: Mar. 2, 1993

[54] HITCH POSITIONING WITH SLIP OVERRIDE CONTROL AND CALIBRATED WHEEL SPEED FOR DETERMINING SLIP

[75] Inventors: Steven C. Young, Lancaster; Bradley A. Nielsen, New Holland, both of Pa.; James W. Macqueene, Willowbrook; Garrett E. Swierenga, Westmont, both of Ill.

[73] Assignee: Ford New Holland, Inc., New Holland, Pa.

[21] Appl. No.: 709,237

[22] Filed: Jun. 3, 1991

[51] Int. Cl.⁵ .......................................... A01B 63/112
[52] U.S. Cl. .......................................... 172/7; 172/2; 364/424.07; 364/426.03
[58] Field of Search .................... 172/217, 8, 9, 10, 11, 172/12; 180/197; 364/424.07, 426.03

[56] References Cited

U.S. PATENT DOCUMENTS

| | | | |
|---|---|---|---|
| 3,834,481 | 9/1974 | Carlson | 180/197 |
| 3,913,680 | 10/1975 | Carlson | 172/2 |
| 4,344,499 | 8/1982 | van der Lely et al. | 172/7 |
| 4,454,919 | 6/1984 | Arnold et al. | 172/7 |
| 4,465,142 | 8/1984 | van der Lely et al. | 172/7 |
| 4,518,044 | 5/1985 | Wiegardt et al. | 172/7 |
| 4,809,785 | 3/1989 | Arnold et al. | 172/9 |
| 4,846,283 | 7/1989 | Batcheller | 172/10 |
| 4,848,481 | 7/1989 | Bidon et al. | 172/7 |
| 4,969,527 | 11/1990 | Boe et al. | 172/2 |
| 4,979,092 | 12/1990 | Bergene et al. | 172/10 |
| 5,012,415 | 4/1991 | Boe et al. | 172/7 |

FOREIGN PATENT DOCUMENTS

| | | | |
|---|---|---|---|
| 2647077 | 5/1977 | Fed. Rep. of Germany | 172/7 |
| 3235818 | 3/1984 | Fed. Rep. of Germany | 172/7 |
| 1042637 | 9/1983 | U.S.S.R. | 172/7 |
| 2160682 | 12/1985 | United Kingdom | 172/2 |

OTHER PUBLICATIONS

SAE Technical Paper 891835 Tractor Three-Point Hitch Control System.
SAE Technical Paper 901561 Development of the Electronic Draft Control System for the Ford New Holland 8210 Tractor.

*Primary Examiner*—Randolph A. Reese
*Assistant Examiner*—Spencer Warnick
*Attorney, Agent, or Firm*—Griffin Butler Whisenhunt & Kurtossy

[57] ABSTRACT

An automatic draft control for controlling the position of a tractor-mounted hitch includes a slip override circuit responsive to a wheel signal for modifying a hitch position command so that hitch draft is reduced by raising the hitch when the degree of tractor wheel slip exceeds a threshold value. The slip is determined by measuring theoretical (no-slip) ground speed with a sensor which senses the rate of rotation of the tractor rear axle, and measuring true ground speed with a radar unit mounted on one side of the tractor. Because the radar unit does not indicate the speed of the center line of the tractor as it turns, the slip signal is prevented from modifying the hitch position command if the hitch is raised since the hitch is usually raised when turning and there is no need to modify the position command with the slip signal when the hitch is raised. The true ground speed is automatically and repeatedly divided by the rate of rotation of the tractor rear axle when conditions are such that wheel slippage is unlikely. The multiple divisions produce plural indications of a correction factor. These indications are filtered to obtain a correction factor which accounts for variations in the effective rolling radius of the wheels. Once the correction factor has been determined it is applied to the wheel speed sensor output to calculate the theoretical ground speed of the vehicle.

20 Claims, 6 Drawing Sheets

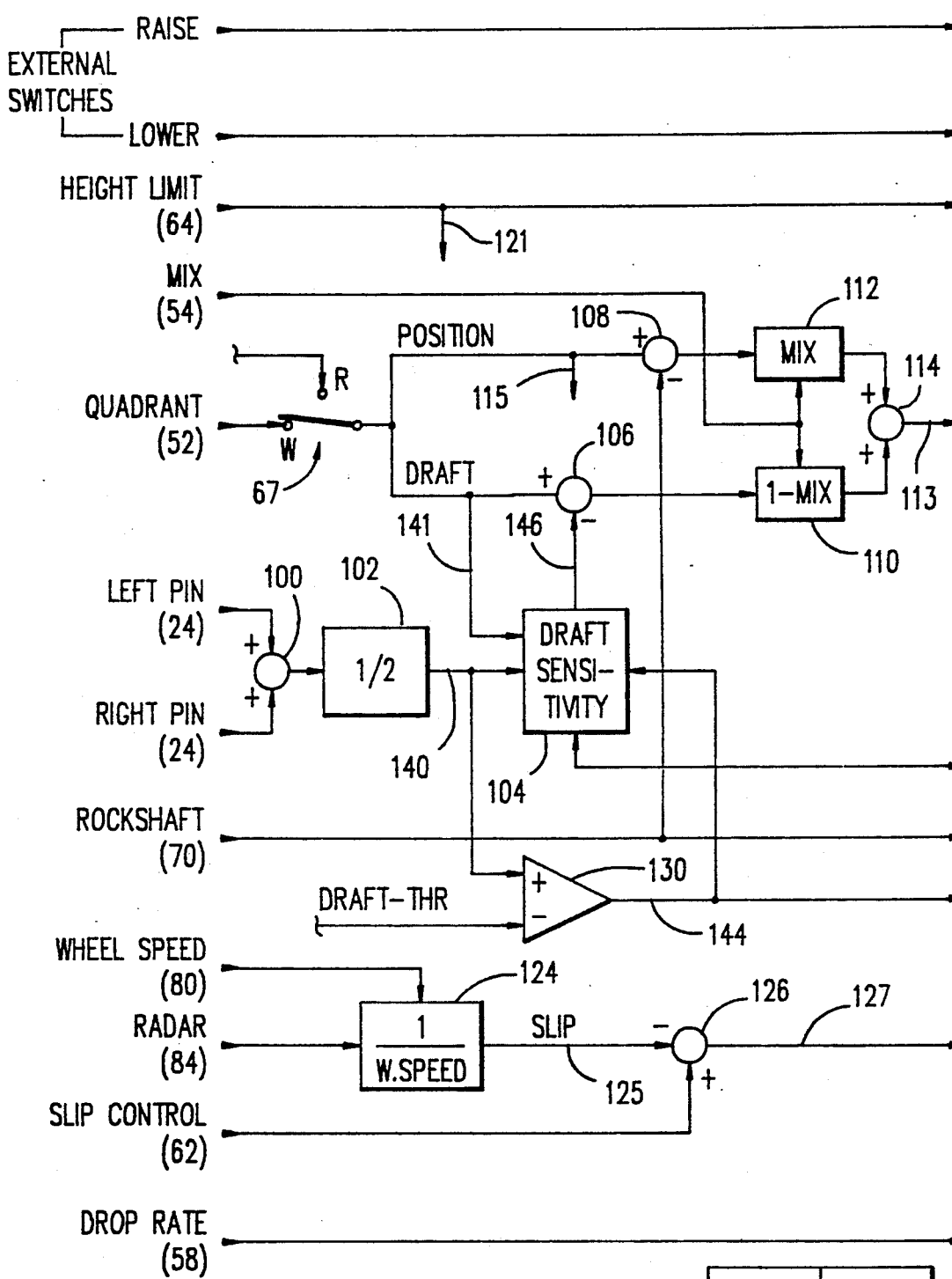
FIG. 4A
FIG. 4
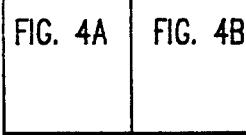

HITCH POSITIONING WITH SLIP OVERRIDE CONTROL AND CALIBRATED WHEEL SPEED FOR DETERMINING SLIP

RELATED APPLICATIONS

This application is related to the following commonly owned and concurrently filed applications, the disclosures of which are incorporated herein by reference.

Application A (Ser. No. 07/709,185) for Draft Control System With Duel Mode Draft Sensitivity Application C (Ser. No. 07/709,236) for Draft Control System With Safety Disconnect Application D (Ser. No. 07/709,184) for Draft Control System With Closed Loop Drop/Raise Rate Control, now abandoned 1. Field of the Invention This invention relates to an automatic draft control system for positioning a vehicle-mounted hitch so that a desired draft is placed on the hitch by a tillage implement attached thereto. More particularly, the present invention relates to automatic draft control systems of the type wherein the degree of wheel slippage is measured to develop a signal for modifying the hitch positioning command.

2. Background of the Invention

U.S. Pat. No. 4,846,283 discloses an automatic draft control system for controlling the positioning of a three-point hitch which is mounted at the rear of a tractor and has a plow attached thereto. Tractor engine speed deviation is measured to determine draft on the hitch and the hitch is positioned so that this draft corresponds to a desired draft selected by an operator-controlled lever. To provide for proper operation of the system compensation is provided for tractor wheel slip. A doppler radar, mounted at the front of the tractor, measures true ground speed while a rear axle rotation sensor provides an indication of theoretical (no-slip) ground speed. These measured values are used to determine wheel slip, and if wheel slip exceeds a predetermined percentage as selected by an operator-controlled potentiometer the hitch positioning signal is modified so as to raise the hitch and thus reduce the draft and, consequently, reduce the wheel slippage.

In the system disclosed in Pat. No. 4,846,283, the radar unit for measuring true ground speed is mounted on the front of the tractor at the center-line where it is in an exposed position. To provide more protection, the radar unit may be attached to one side of the tractor chassis between the front and rear wheels. However, when the radar unit is not mounted at the center-line of the tractor it gives a false indication of the true ground speed when the tractor is turning in the headland at the end of a field. The false indication will be greater or less than the true ground speed depending on whether the tractor is turning away from or toward the side on which the radar unit is mounted. The false indication of true ground speed results in a false indication of wheel slip and, in turn, the false indication of wheel slip may restrict lowering of the hitch or cause it to erroneously raise as the tractor re-enters the field and the operator actuates the control to lower the hitch.

A further problem in developing an accurate wheel slip indication is related to the way in which theoretical ground speed is determined. The ratio of true ground speed (TGS) to the theoretical ground speed is used to calculate wheel slip. In practice, the rotational speed (WS) of a drive wheel is measured by measuring the rate of rotation of the rear axle and WS is equated to TGS under zero slip conditions. The correction factor, the ratio of TGS to WS, is then used to correct WS for other rotational speeds. This eliminates the need to measure the effective circumference (or rolling radius) of the wheel but it requires an input by the operator to indicate when the zero slip reference point is to be established. Also, the zero slip reference point must be re-established when there is a change in tire size, inflation pressure, tire wear or any other factor affecting the true rolling radius of the wheels. Furthermore, should the operator forget to re-establish the reference after such a change, or attempt to re-establish the reference under the wrong conditions, the result is inaccurate wheel slip measurement and, consequently, erroneous control of the hitch position.

SUMMARY OF THE INVENTION

An object of the invention is to improve the operation of an automatic draft control system having a slip override circuit for modifying a hitch positioning signal in response to the degree of wheel slip.

Another object of the invention is to provide a method and apparatus for automatically inhibiting modification of a hitch positioning signal with a slip modification signal during turning in a headland.

A further object of the invention is to provide an improved method and apparatus for controlling the positioning of a vehicle-supported hitch in a system of the type wherein a true ground speed sensor is mounted at a side of the vehicle and provides an output signal used to develop a wheel slip signal for modifying a hitch positioning signal.

The above-stated objects are accomplished by providing an inhibit apparatus for inhibiting application of the wheel slip signal to the hitch positioning control loop. The inhibit apparatus is enabled when the operator raises the hitch at the end of a row or field and is disabled when the implement enters the ground as the operator lowers the hitch upon re-entering the field.

Still another object of the invention is to provide a novel method and apparatus for automatically determining a wheel speed correction factor. In accordance with this aspect of the invention, true ground speed and hitch position are continuously monitored for conditions where it is highly unlikely that there is any wheel slip, that is, the hitch is above a position which insures that any implement mounted on the hitch is above the ground, and the true ground speed is greater than some threshold value. When these conditions are found to exist, the wheel speed and true ground speed are sensed and the true ground speed is divided by the wheel speed to obtain a wheel speed correction factor which is stored. Subsequent wheel speed measurement values may then be multiplied by this factor to obtain the true wheel speed. According to an alternate method of developing a wheel speed correction factor, the true ground speed and hitch position are monitored as in the above-described method. When the hitch is raised and the true ground speed is greater than 10 mph, the true ground speed and wheel speed are sampled every ¼ second. If the true ground speed and wheel speed both remain constant for five samples, a new wheel speed correction factor is calculated by dividing the sampled true ground speed by the sampled wheel speed. Once the speed correction factor has been updated, it is not updated again until the true ground speed drops to 8 mph and then exceeds 10 mph.

Other objects of the invention and its mode of operation will become apparent upon consideration of the following description and the accompanying drawings.

BRIEF DESCRIPTION OF THE DRAWINGS

FIGS. 4A and 4B, when arranged as shown in FIG. 4 comprise a schematic diagram illustrating logic used in the automatic draft control;

DETAILED DESCRIPTION OF THE INVENTION

Figure 1:
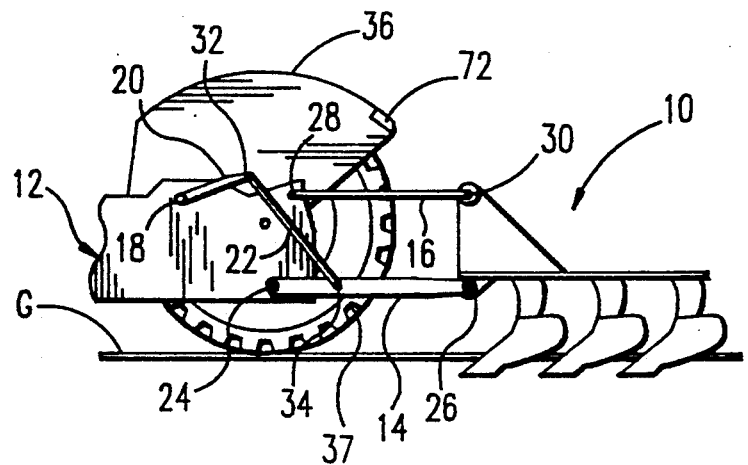
FIG. 1 illustrates a tractor-mounted hitch having a tillage implement attached thereto.

FIG. 1 illustrates a three-point hitch connecting a moldboard plow or other tillage implement 10 to the rear of a tractor 12. The hitch comprises left and right lower links 14 (FIG. 2), an upper link 16, a rock-shaft 18 having crank arms 20 affixed thereto, and left and right adjustable links 22.

The lower links 14 are pivotally attached at one end by pins 24 to a frame member of the tractor, and at the other end links 14 are pivotally attached to the implement 10 by pins 26. Upper link 16 is pivotally attached to a frame member of the tractor by a pin 28, and pivotally attached to implement 10 by a pin 30. Each adjustable link 22 is connected at one end by a pivot pin 32 to a crank arm 20 and connected at the other end by a pivot pin 34 to an intermediate position of a lower link 14.

The position of implement 10 relative to ground G is adjusted by rotating rock-shaft 18 through an arc. In FIG. 1, as the rock-shaft 18 is rotated counter-clockwise, crank arms 20 act through adjustable links 22 to pivot lower links 14 counter-clockwise about pins 24. As link pins 26 are raised, the upper link 16 prevents the weight of the implement from pivoting the implement downwardly about pins 26, and the upper portion of the implement pivots in an arc whose center is located at pin 28.

Figure 2:
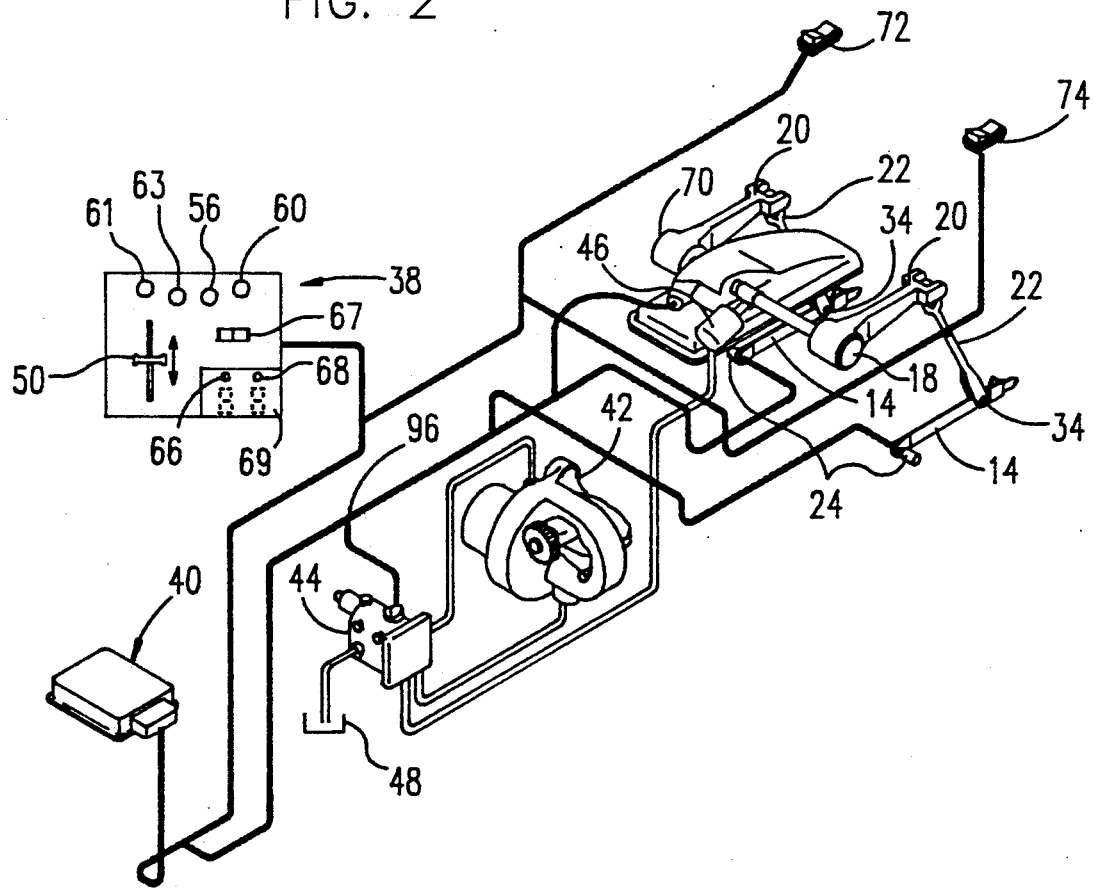
FIG. 2 is a schematic view of a three point hitch and an automatic draft control therefor.

FIG. 2 schematically illustrates an automatic draft control system for controlling the movements of the hitch by controlling movement of the rock-shaft 18. The control system includes an electronic draft control (EDC) console 38, a microprocessor 40, a pump 42, an electrohydraulic proportional control valve 44, and a hydraulic lift cylinder 46.

Figure 3:
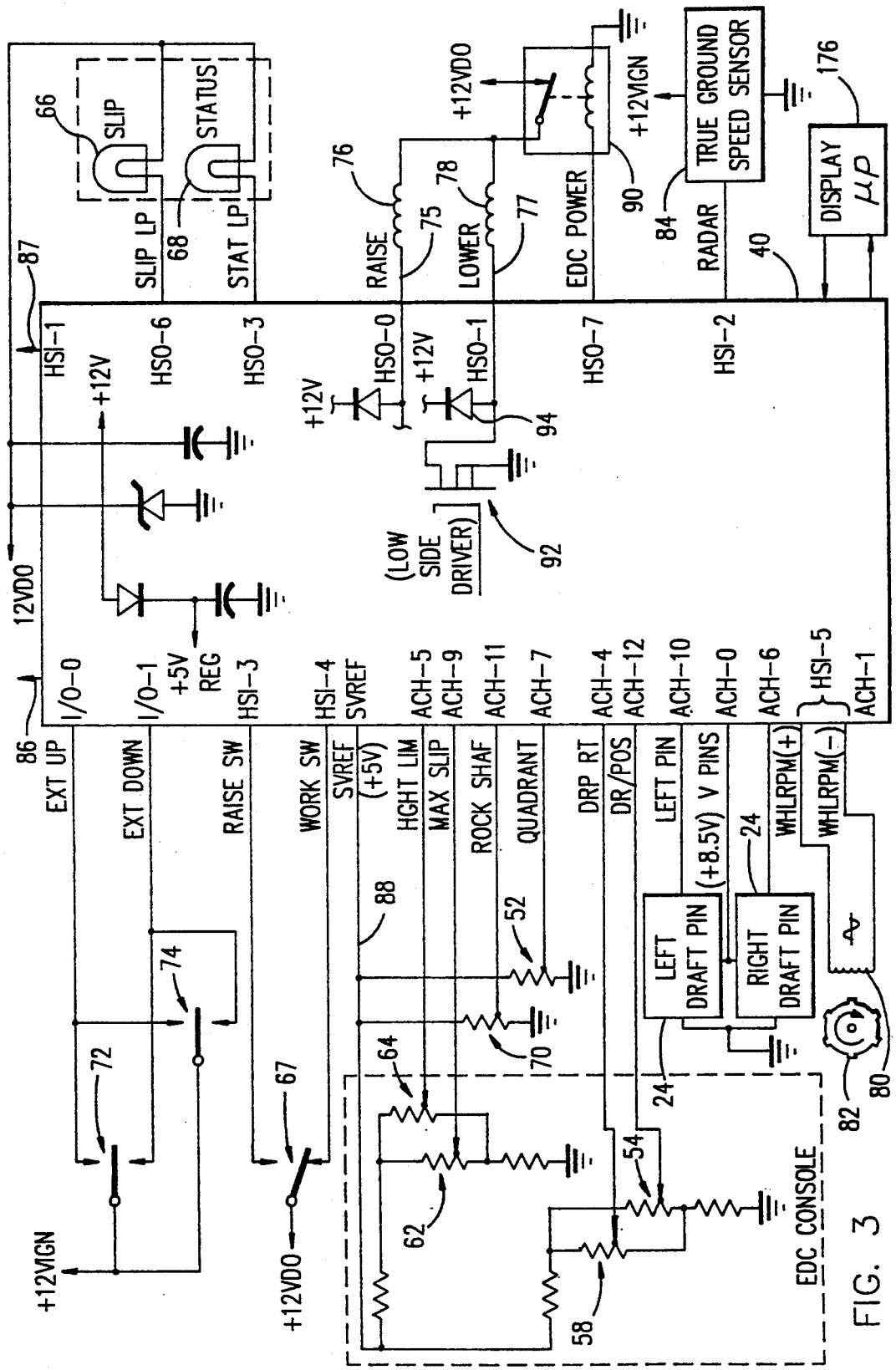
FIG. 3 illustrates an automatic draft control microprocessor and inputs and outputs therefor.

The control console 38 has a hitch lift control or quadrant lever 50 which is pivoted near its lower end. As the lever 50 is moved forwardly or backwardly it actuates a potentiometer 52 (FIG. 3). The quadrant lever is used to control the positioning of the hitch. A detent or stop (not shown) is provided for limiting forward movement of the quadrant lever 50. When the quadrant lever is moved forwardly beyond the detent, it places the control system in an open-loop or external mode which permits use of external fender-mounted switches to control positioning of the hitch.

The console also includes a position/draft mix control potentiometer 54 (FIG. 3) operated by a control knob 56 and a drop rate control potentiometer 58 operated by a control knob 60. The purpose of the control potentiometers 54 and 58 is explained below.

A digital display 69 is provided on the console to indicate the relative hitch position. In addition, the EDC console also includes a slip control knob 61 for controlling a maximum slip limit potentiometer 62, a height limit control knob 63 for controlling a height limit potentiometer 64, a slip indicator lamp 66 and an EDC status lamp 68. A work/raise rocker switch 67 is also provided on the console. This switch enables the operator to selectively raise the hitch to the height limit set by control knob 63, or lower the hitch to the position specified by the quadrant lever 50, by merely actuating the switch.

As subsequently explained, the hitch height may be controlled by a variable mix of position and draft signals. This requires that the position of the hitch and the draft be known. Therefore, a rotary potentiometer 70, driven by rock-shaft 18, is provided to sense the position of the hitch. The pivot pins 24 are load sensitive pins such as those available from the Robert Bosch company and provide a means for sensing the draft. These pins provide an electrical output signal directly related to the horizontal component of the forces on the lower links 14.

To provide for manual control of the hitch position when attaching or detaching an implement 10, two three-position rocker switches 72 and 74 are mounted on the left and right fenders 36 covering the rear tractor wheels 37. Switches 72 and 74 are rendered operable by first moving the quadrant lever 50 forwardly past the detent position to initiate an external mode of operation. While the system is in the external mode, either switch 72 or 74 may be manipulated to raise or lower the hitch. The external mode, once initiated, remains in effect until the quadrant lever 50 is moved rearward of the detent position.

Generally speaking, microprocessor 40 repeatedly samples the output signals from the various sensors, switches and potentiometers, and produces a pulse width modulated signal for controlling a "raise" solenoid 76 or a "lower" solenoid 78 (FIG. 3) associated with the hydraulic proportional valve 44. To raise the hitch, fluid pressurized by pump 42 is passed through the valve to extend lift cylinder 46 which rotates rock-shaft 18 counter-clockwise. To lower the hitch, the "lower" solenoid is energized to dump fluid from the lift cylinder 46 through valve 44 to sump 48. The hitch falls under its own weight and rotates the rock-shaft 18 clockwise to retract the lift cylinder.

Referring now to FIG. 3, the microprocessor 40 may be an EEC-IV module of the type used by Ford Motor Company for automotive engine control. The microprocessor module comprises a type 8061 microprocessor with a 32K byte EPROM and a 16×16 bit E²-PROM. The module also includes a plurality of analog input channels with A/D conversion means for converting the analog input signals to digital signals for use in the microprocessor. The outputs of potentiometers 52, 54, 58, 62, 64 and 70 and the draft sensor pins 24 are connected to the analog input channels. The fender switches 72 and 74 and the raise/work switch 67 are connected to digital inputs of the microprocessor.

The microprocessor 40 has a frequency input which is connected to a magnetic sensor 80. This sensor senses teeth on a gear 82 which rotates with the rear wheel axle of the tractor. The sensor produces an output signal at a frequency proportional to the rate of rotation of the axle. This signal is calibrated under zero wheel slip conditions as subsequently described so that it may be used as a representation of theoretical ground speed regardless of the effective rolling radius of the wheels. A doppler radar unit 84 is mounted on one side of the tractor and directed at an angle toward the ground. The radar unit senses true ground speed and applies to the microprocessor signals representing this speed. The wheel (axle) speed sensor and radar output signals are analyzed by the microprocessor to determine the degree of tractor wheel slip.

Power for the microprocessor and EDC control system is derived from the battery of tractor 12. Battery power is continuously applied to microprocessor 40 over lead 86 to power a keep-alive memory in the microprocessor. This memory enables stored data and status information to be retained when the tractor ignition switch (not shown) is off. A voltage +12 VIGN is derived from the battery through the ignition switch. The battery also provides a voltage +12 VDO through a relay circuit that does not drop out until 8 seconds after the ignition key switch is turned off. This latter voltage is applied to a voltage regulator circuit within the microprocessor 40 to generate a regulated voltage of +5 volts. Both of these voltages are applied to logic circuits within the microprocessor. In addition, the +5 volt signal is applied over a lead 88 to the potentiometers 52, 54, 58, 62, 64 and 70. A lead 87 is connected to the ignition switch and provides a signal to the microprocessor when the switch is closed.

Insofar as the automatic draft control is concerned, the microprocessor has only five outputs. Two of these outputs are for energizing the slip lamp 66 which is energized when the degree of wheel slip exceeds the limit as set by operator adjustment of potentiometer 62 and EDC status lamp 68 which indicates if the automatic draft control is active or inactive. Two additional outputs are provided for energizing the raise solenoid 76 and lower solenoid 78 associated with the lift control valve 44. The last output energizes the coil of a safety relay 90 having a normally closed contact connected between +12 VDO and the raise and lower solenoids 76 and 78.

As shown in FIG. 3, the other side of the lower solenoid 78 is connected through a low side driver 92 to ground, and through a diode 94 to +12 V. The raise solenoid 76 is similarly connected to a further low side driver (not shown). Normally, the relay 90 is not energized so that +12 V is applied through its normally closed contacts to the solenoids 76 and 78. When the hitch is to be lowered, the microprocessor produces a pulse width modulated signal that turns on the driver 92 thus establishing a circuit from +12 V through the solenoid 78 and the driver to ground. The solenoid 78 controls valve 44 so that hydraulic pressure to the lift cylinder 46 is reduced and the hitch drops because of its own weight and the weight of the implement 10. To raise the hitch, the driver for solenoid 76 is turned on to energize the solenoid. The solenoid operates the valve so that fluid under pressure is applied to the lift cylinder from the pump 42.

From FIG. 2, it is evident that the leads 75 and 77 between the microprocessor 40 and the raise and lower solenoids 76 and 78 associated with valve 44 extend from some length through a wiring harness 96. Furthermore, it is evident from FIG. 3 that if the lead 77 should be shorted to ground, the lower solenoid 78 would be energized in the same manner as if the low side driver 92 were turned on. A similar situation exists for the raise solenoid 76 if lead 75 is shorted. As explained in copending Application C, relay 90 is provided to inhibit uncommanded movement of the hitch as a result of such shorts.

The microprocessor 40 may have additional inputs and outputs permitting it to control the tractor transmission and a tractor performance monitor but these are not shown in FIG. 3 since they are not necessary for an understanding of the present invention.

Figure 4B:
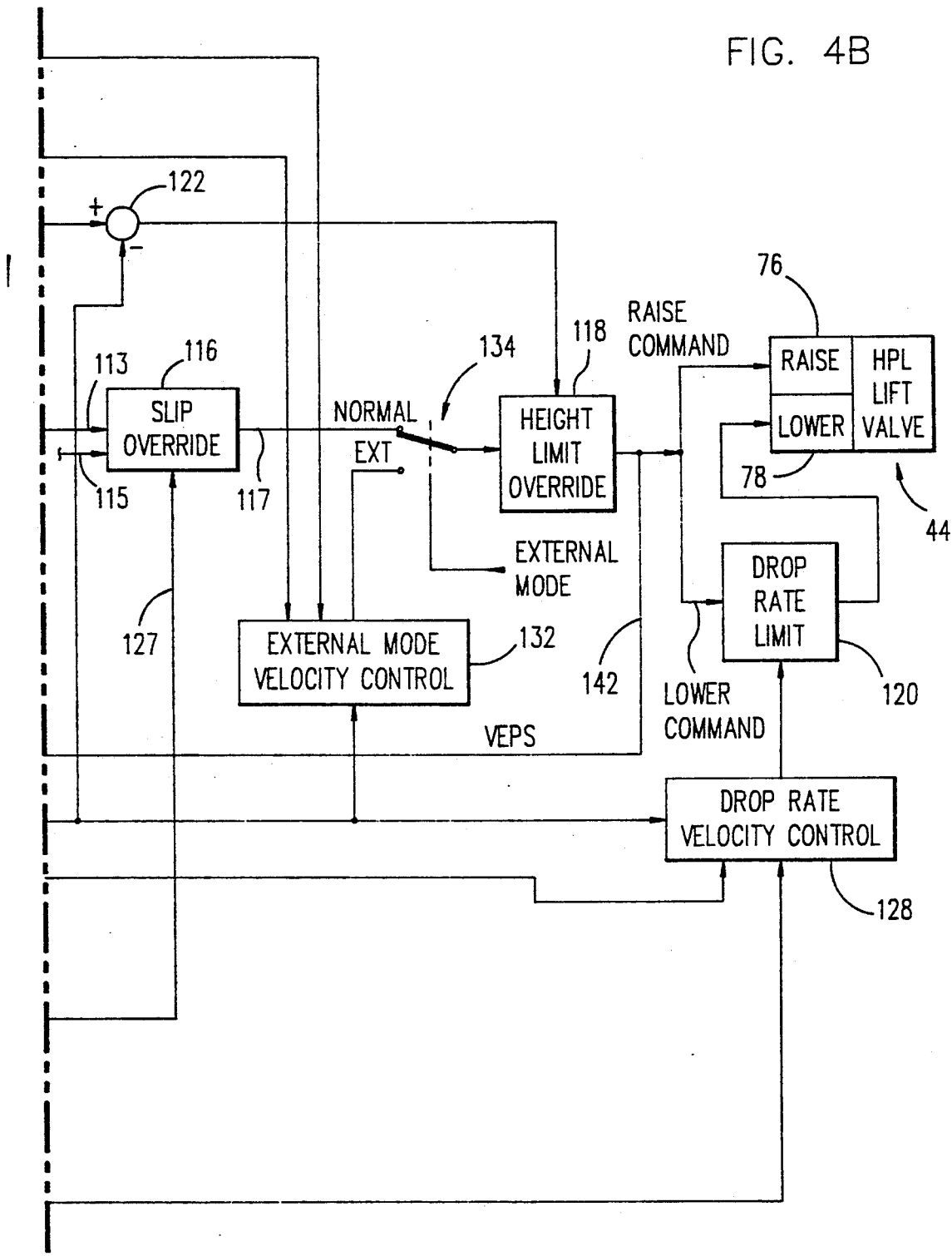

FIG. 4 is a schematic circuit diagram illustrating the logical sequence of operations performed by the program which controls microprocessor 40. These operations need not be performed by a programmed microprocessor but could also be performed by a combination of analog or digital hardware elements.

Most of the input control signals for the automatic draft control are shown at the left of FIG. 4. These signals have been derived by sensing the various potentiometers, sensors and switches and, where appropriate, digitizing the analog signals and then digitally filtering them. Furthermore, the signals may have been subjected to a scaling function prior to the time they appear as input signals in FIG. 4. These operations are conventional and thus are not shown.

After the signals from the right and left draft sensor pins 24 are digitized, compensation made for the static weight of the hitch, and low pass filtered to eliminate frequencies above about 3.2 Hz, they are added together by an adder 100 and the sum divided by 2 by a divider 102 to obtain an average composite draft feedback signal COMPDRFT_I which is applied to a draft sensitivity control 104 over a lead 140. As described in copending Application A, the draft sensitivity control 104 either applies the signal COMPDRFT_I directly to a subtractor 106, or low pass filters the signal before applying it to the subtractor so that frequencies above 0.5 Hz are filtered out. The purpose of the draft sensitivity control is to reduce tractor vibrations which would otherwise occur as the hitch moves in response to a change in the position of quadrant lever 50.

The quadrant lever 50 (FIG. 2) provides single lever control of both a hitch position command and a draft command. The signal derived from the quadrant lever potentiometer 52 is applied to the raise/work switch 67 and if the switch is set to the "work" position a digitized signal (Q_EFF) is applied to the draft sensitivity control 104 over a lead 141. Q_EFF is also subjected to two different shaping functions (not illustrated) to derive a draft command which is applied to a subtractor 106 and a position command which is applied to both the subtractor 108 and a wheel slip override circuit 116. The digitized output of the rock-shaft potentiometer 70 is also applied to the subtractor 108 so that the subtractor produces an output proportional to the difference between the hitch position as commanded by the quadrant lever 50 and the actual hitch position as sensed by the rock-shaft potentiometer 70. In like manner, the output of subtractor 106 represents the difference between the draft as commanded by the quadrant lever 50 and the actual draft as sensed by the draft sensor pins 24.

The difference values obtained by subtractors 106 and 108 are fed to two mix determining circuits 110 and 112, respectively, where the output of subtractor 108 is multiplied by a mix factor determined by the setting of mix potentiometer 54. The output of the mix potentiometer is scaled to represent a value in the range of 0.3 to 1.0. The output of the subtractor 106 is multiplied by one minus the mix factor. The resulting values obtained at 110 and 112 are then summed by an adder 114.

The value derived by adder 114 may be subjected to slip override modification at 116 or height limit override modification at 118 before it is utilized to generate a pulse width modulated signal for application to the raise or lower solenoid 76 or 78 associated with the lift valve 44. In addition, if the output at 118 calls for lowering the hitch, the "lower" command may be further modified at 120 to limit the rate at which the hitch is lowered.

Since operation of the lift valve 44 changes the position of the hitch relative to the ground, and thus the position of the rock-shaft, and the depth to which the implement penetrates the ground affects the signals generated by draft sensor pins 24, it is seen that FIG. 4 illustrates two inter-dependent closed loops, a position feedback loop and a draft feedback loop, with the input control for both loops being derived from the quadrant lever 50 and the control signals being weighted by the setting of the mix potentiometer 54. SAE Technical Paper No. 901561 entitled *Development of the Electronic Draft Control System for the Ford New Holland 8210 Tractor* describes a draft/position feedback loop of this type.

The height limit potentiometer 64 enables the operator to manually select the maximum height to which the hitch may be raised. A subtractor 122 subtracts the signal derived from the rock-shaft potentiometer 70 from the signal derived from potentiometer 64. As the hitch approaches the selected height limit the raise command at the output of circuit 116 is forced to zero.

The slip override circuit 116 is controlled by the outputs of radar unit 84, wheel speed sensor 80, the draft command from the quadrant lever, and the slip control potentiometer 62. The radar unit measures true ground speed (TGS) while the sensor 80 measures theoretical ground speed. After correction of the nominal wheel speed value as subsequently described, the true ground speed is divided by the wheel speed (W_SPEED) at 124 to compute the degree of wheel slip. The slip value is compared at 126 with a maximum permissible slip value set by the operator on slip control potentiometer 62. When actual slippage exceeds the selected maximum, a signal is produced on lead 127 which modifies the value in the main control loop so that the hitch is raised. This lifts the implement 10 relative to the ground so as to place a smaller load on the tractor, and this in turn reduces wheel slip.

The purpose of the drop rate velocity control circuit 128 is to limit the rate at which the hitch is lowered. This rate may be manually selected by the operator by adjusting the drop rate potentiometer 58. Circuit 128 continuously adjusts the valve "lower" command at 120 to maintain a desired hitch velocity. The operation of the drop rate velocity control circuit is explained in copending Application D. The drop rate velocity control function is inhibited when the implement is in engagement with the ground so that the hitch may respond quickly and properly to the draft correction signal derived at 118. The compensated draft signal derived at 102 is applied over lead 140 to a comparator 130 where it is compared with a threshold value. When the draft signal exceeds the draft threshold value (the implement engages the ground) the comparator produces a signal on lead 144 to inhibit drop rate velocity control circuit 128.

The external mode velocity control circuit 132 is responsive to output signals from the external fender switches 72, 74 for controlling the raising or lowering of the hitch under operator control at a constant velocity. This facilitates connection or separation of implements from the hitch. As explained in copending application C, circuit 132 regulates hitch movement according to an integral velocity control algorithm which provides consistent, slow and safe operation. The command issued to valve 44 is limited to maintain a constant rate of lift movement thereby compensating for variations in implement weight, system temperature, pilot pressure and valve performance.

The external mode velocity control circuit 132 is enabled only by moving the quadrant lever 50 forward beyond a detent position so as to generate the External Mode command. In FIG. 4, this operation is equivalent to a switch as illustrated at 134. When the system is in the External Mode, the feedback control loop is open and the output of the circuit 132 is applied to the height limit override circuit 118. The output of circuit 132 is disabled by moving the quadrant lever 50 rearwardly of the detent position. The closed loop is restored by capturing the hitch by moving the quadrant lever 50 to generate a position command corresponding to the current position of the hitch.

Figure 5:
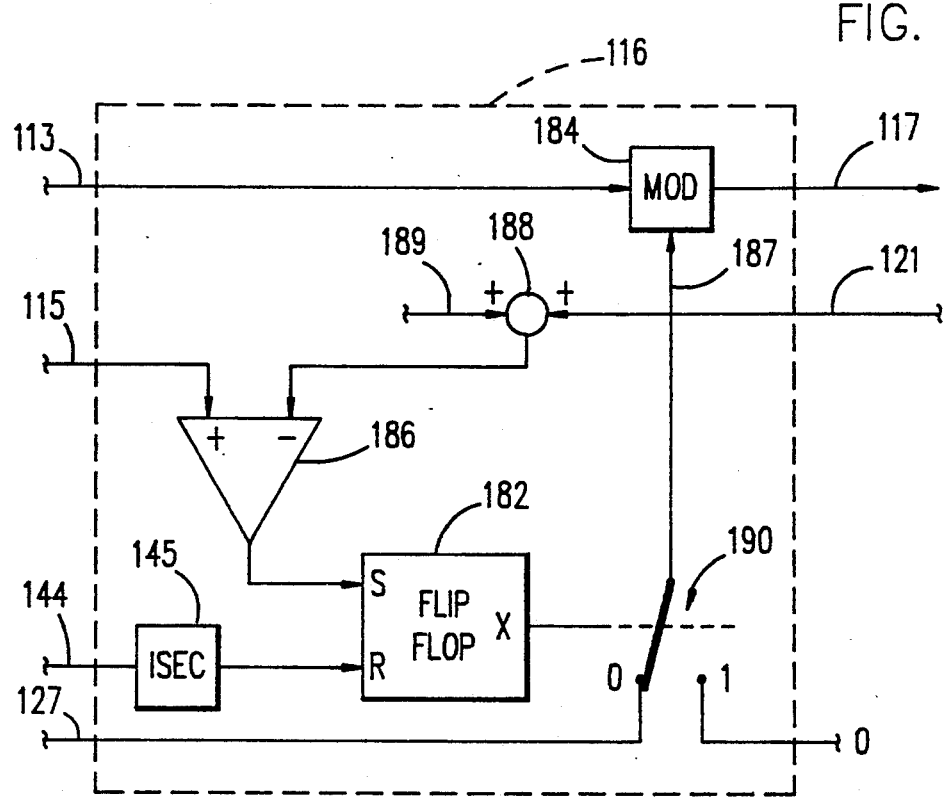
FIG. 5 is a schematic diagram of a circuit equivalent to a program routine executed by the microprocessor to disable slip override control.

FIG. 5 is a hardware circuit representation of the operations performed by the slip override circuit 116 of FIG. 4. The operation of this circuit may be illustrated by considering a normal sequence of events. Assume that the tractor 12 is moving over a field with the hitch lowered so that the implement 10 engages the ground. As previously explained, the comparator 130 of FIG. 4 produces an output signal on lead 144 when the implement is in engagement with the ground. In FIG. 5, the signal on lead 144 is applied to a circuit 145 which produces an output signal only after the implement has been in engagement with the ground for a predetermined time interval on the order of 1 second. Circuit 145 produces an output signal that resets an indicator represented as a flip-flop 182. When the flip-flop is reset, the slip signal produced on lead 127 by the subtractor 126 is applied to a modifier circuit 184. The modifier circuit responds to the slip signal by modifying the position error signal on lead 113 so that the resulting error signal on lead 117 tends to raise the hitch. As the hitch is raised, the draft, and consequently the wheel slip, is reduced until the wheel slip is less than the wheel slip rate selected by operator adjustment of the slip rate potentiometer 62.

As the tractor approaches the end of a field, the operator normally initiates raising of the hitch and begins turning the steering wheel of the tractor. The raising of the hitch may be initiated either by using the quadrant lever 50 or, more commonly, by switching the work/raise switch 67 to the "raise" position. In either event, the position command signal on lead 115 increases. This signal is applied to one input of a comparator 186 having an output connected to the set input of flip-flop 182.

An adder 188 provides the second input to comparator 186. The adder receives a first input over lead 121 and this input represents the maximum hitch height as determined by the operator's setting of the height limit potentiometer 64. The second input to adder 188 is a bias value on lead 189. The purpose of adding in the bias value is to disable the slip override feature when the hitch position command is within a certain range, specified by the bias value, of the height limit. The bias value never changes during operation of the hitch control system.

When the signal on lead 115 commands positioning of the hitch higher than a threshold height, that is, when it exceeds the output signal from adder 188, the comparator produces an output signal to set flip-flop 182. When the flip-flop is set, a switch 190 disconnects lead 127 from the input lead 187 to modifier circuit 184 and the input lead is connected to an open circuit through the switch. Therefore, the position error signal on lead 113 is passed through modifier circuit 184 without modification by the wheel slip signal.

Since the slip signal on lead 127 is disconnected from modifier circuit 184, the position error signal on lead 113 is not modified by the circuit. Thus, as the operator enters a turn in the headlands the erroneous slip signal has no effect on hitch positioning.

About half-way through a turn the operator normally begins lowering the hitch so that the implement engages the ground shortly after the implement clears the headland. If the slip override were not disabled during this time, the slip signal on lead 127, which may indicate a high rate of slip at this time, would override the operator's positioning command and either slow the rate of hitch drop or even cause it to raise.

The operator commands lowering of the hitch either by moving quadrant lever 50 or, more often, by switching the work/raise switch 67 to the work position. As this occurs, the signal on lead 115 decreases and becomes less than the signal from adder 188 so that the output from comparator 186 drops. However, flip-flop 182 remains set until the implement engages the ground. When this happens, comparator 130 produces a signal on lead 144 and if this signal persists for 1 second the circuit 145 produces an output signal to reset flip-flop 182 thereby again connecting the slip signal on lead 127 to the modifier circuit 184. The slip override circuit 116 thus resumes the mode of operation wherein the position error signal on lead 113 is modified in accordance with the slip signal on lead 127. The 1 second delay in resetting flip-flop 182 after the implement engages the ground allows the bouncing of the tractor, resulting from the lowering of the implement to die out. This prevents false re-enablement of the slip override due to draft signal variations resulting from the bouncing or the dynamic effects of the implement during lowering.

Figure 6:
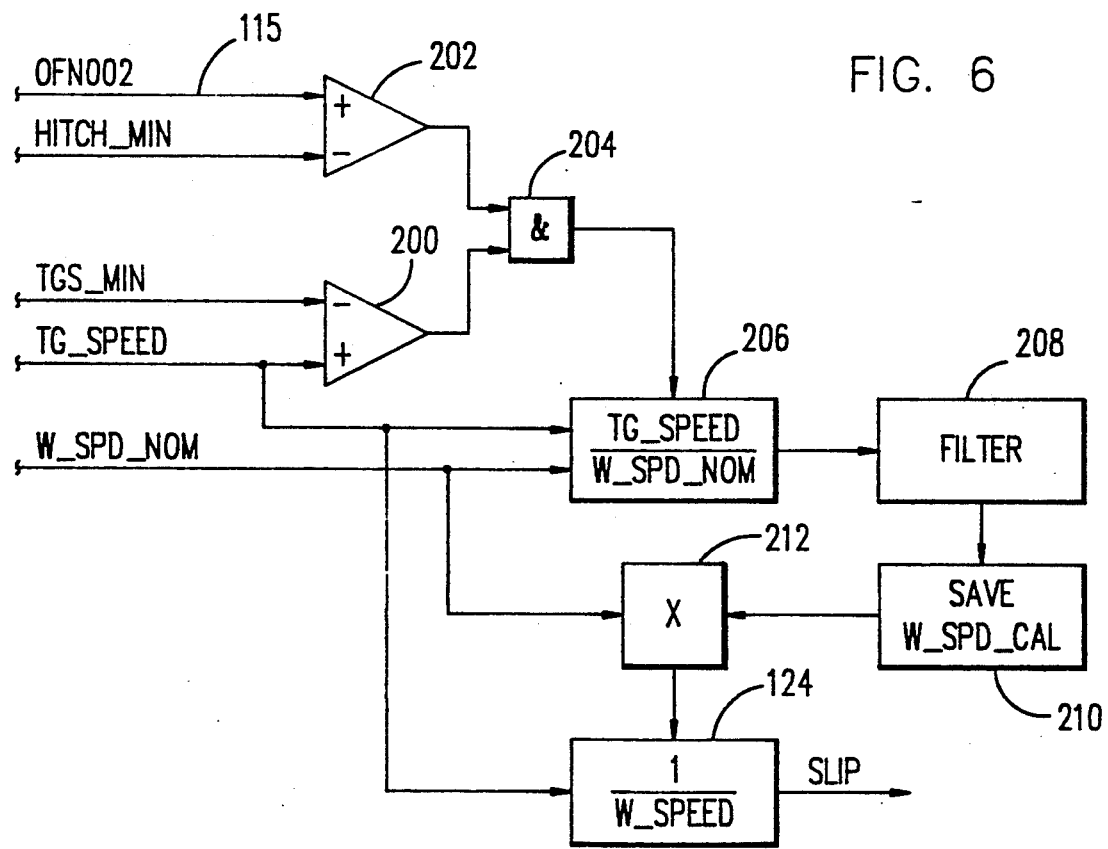
FIG. 6 shows a circuit equivalent of a program routine executed by the microprocessor to develop a wheel speed correction factor; and, FIG. 7 is a flow chart of a routine for developing a wheel speed correction factor according to an alternate method.

FIG. 6 illustrates a circuit equivalent of the steps executed by microprocessor 40 to calibrate the zero slip reference or, more specifically, develop a correction factor for correcting the indicated wheel speed (W_SPD_NOM), appearing at the output of speed sensor 80, for changes in the effective rolling radius of the tractor wheels. As previously explained, the wheel speed sensor 80 actually senses rotation of the rear axle of the tractor. It is therefore necessary to establish a correction factor which relates the output of the sensor to the theoretical (no-slip) ground speed. This correction factor is established by dividing the true ground speed (TG_SPEED) measured by radar unit 84, by the output (W_SPD_NOM) of the wheel speed sensor when the tractor and hitch are operating such that wheel slip is highly improbable. The microprocessor automatically and repeatedly updates the correction factor as long as the hitch is raised and the true ground speed is at least as great as a minimum threshold speed TGS_MIN. This minimum speed may be on the order of 10 mph but the speed is not critical so long as it is chosen to be in a range of speeds where it is highly unlikely that the tractor wheels are slipping. The true ground speed (TG_SPEED) as measured by the radar unit 84 is applied to a comparator 200 where it is compared with TGS_MIN.

To determine if the hitch is raised, the rockshaft position signal OFN002 on lead 115 is compared by a comparator 202 with a threshold value (HITCH_MIN) where HITCH_MIN represents the lowest position of the hitch at which the implement 10 is sure to be above the ground level.

If the hitch is raised and TG_SPEED is above the minimum threshold speed, comparators 200 and 202 enable an AND circuit 204. As illustrated in FIG. 6, the output of AND 204 enables a divider 206 which divides TG_SPEED by W_SPD_NOM. The result is the correction factor W_SPD_CAL which may be used to correct the axle speed signal W_SPD_NOM.

The correction factor W_SPD_CAL is filtered very low bandwidth (0.016 Hz) low pass filter 208. This filter has a time constant of about 10 seconds so that the value of W_SPD_CAL changes slowly and only true long term changes in the rolling radius of the wheels bring about changes in the correction factor.

The filtered correction factor W_SPD_CAL is stored or saved in a memory so that it is available for subsequently correcting W_SPD_NOM. The correction is accomplished by a multiplier 212 which multiplies W_SPD_NOM by W_SPD_CAL to obtain the theoretical ground speed value W_SPEED. The true ground speed value TG_SPEED is then divided by the theoretical ground speed value in the divider 124 to produce the slip signal on lead 125.

It will be understood that the microprocessor 40 repeatedly tests the various sensors and the positions of the hitch control potentiometers and branches to various routines to carry out different operations based on the conditions sensed. Each time the conditions tested for by comparators 200 and 202 and AND 204 are met, the program executes the calibration routine represented by divider 206, filter 208 and memory 210. This continues until the conditions are no longer met. The last value of the correction factor stored in the memory is then used to correct W_SPD_NOM until the conditions are again met. The memory 210 is a non-volatile memory so that the correction factor is not lost when the tractor battery is disconnected.

Figure 7:
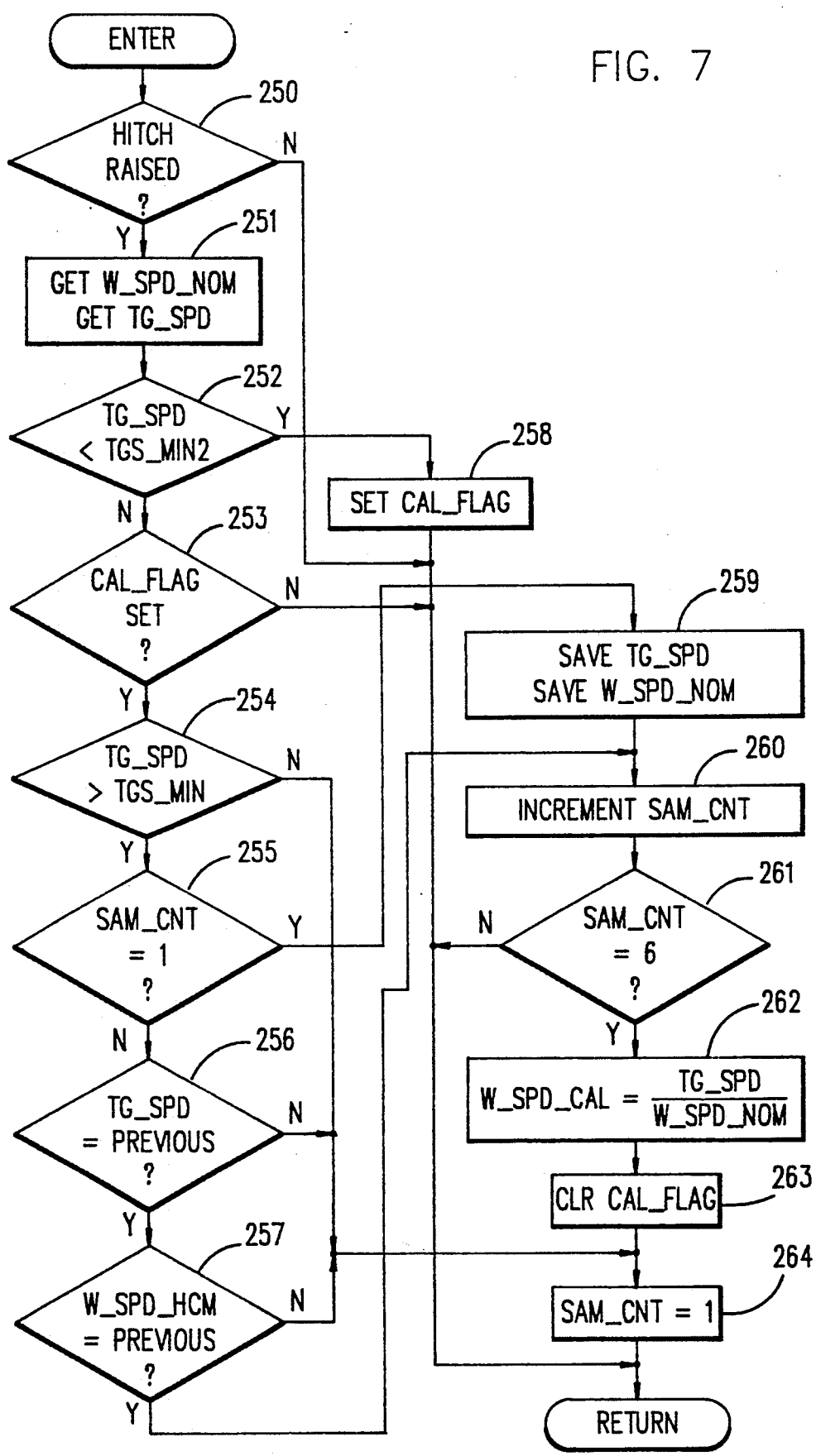

The zero-slip auto-calibration method represented by FIG. 6 is admirably suited for control purposes However, FIG. 7 shows an alternate method which is equally suitable for use in determining W_SPD CAL. Briefly, the method of FIG. 7 permits determination of W_SPD_CAL only when the hitch is raised and the tractor is moving at least 10 mph. W_SPD_NOM and TG_SPD are sampled at ¼ second intervals and both values must remain constant for 5 consecutive samples. Once these conditions are met, W_SPD_CAL is calculated. Once W_SPD CAL is calculated, it is not calculated again until the tractor speed drops to 8 mph and then returns to at least 10 mph.

The routine of FIG. 7 may be executed by microprocessor 40 but it is preferred that a second microprocessor 176 (FIG. 3) connected to microprocessor 40 by serial data links, execute the routine as well as control a display and the sensing of various tractor engine conditions.

The microprocessor enters the routine of FIG. 7 every ¼ second. Step 250 determines if the hitch is raised. If it is not, a return is made to the main program. If the hitch is raised, W_SPD_NOM and TG_SPD are sampled at step 251 and at step 252 TG_SPD is tested to see if the tractor speed is less than 8 mph. If it is, a flag CAL_FLAG is set at step 258 before a return is made to the main program.

Assume now that the tractor speed is increased to a speed between 8 and 10 mph with the hitch raised. The next time the routine of FIG. 7 is entered, the test at step 250 proves true and the test at step 252 proves false so CAL_FLAG is tested at step 253. Since the flag is set, step 254 is executed to see if the tractor speed is at least 10 mph. Under the assumed conditions it is not so the routine jumps to step 264 to set a value 1 in a sample counter SAM_COUNT. This counter counts the number of consecutive samples during which W_SPD_NOM and TG_SPD remain constant. After SAM_CNT is set, a return is made to the main program.

Assume now that the tractor speed is increased to at least 10 mph with the hitch still raised. The next time the routine of FIG. 7 is entered, steps 250-254 are executed and the test at step 254 proves true because the tractor speed is at least 10 mph. SAM_CNT is tested at step 255 and since it contains a count of 1 it means that the samples of W_SPD_NOM and TG_SPD taken at step 251 are the first samples for this calibration sequence. The sampled values are saved in memory at step 259 and SAM_CNT is incremented at step 260.

SAM_CNT is then checked at step 261 to see if it contains a count of 6, that is, whether 5 samples have been accumulated. Since SAM_CNT=2 the routine returns to the main program from step 261.

Assuming hitch and speed conditions remain the same, the next time the routine is entered steps 250-255 are executed and the test at step 255 proves false. At step 256 the most recently taken sample of TG_SPD is compared with the first sample of TG_SPD to see if they are equal. Assuming they are, step 257 is executed to see if the most recent sample of W_SPD_NOM is equal to the first sample of W_SPD_NOM. Assuming they are, the routine increments SAM_CNT at step 260 and tests SAM_CNT at step 261. Since SAM_CNT now contains a count of 3, the routine returns to the main program.

Assuming the tractor speed remains constant and the hitch remains raised, steps 250-257, 260 and 261 are again executed the next two times the routine of FIG. 7 is entered with SAM_CNT being incremented at step 260 on each execution so that it is advanced to 4 and then to 5.

The next time the routine is entered, steps 250-257 and 260 are executed assuming no change in conditions. However, when SAM_CNT is incremented at step 260 it then contains a count of 6 so that test at step 261 proves true. This indicates that five consecutive samplings of W_SPD_NOM and TG_SPD have been found to be the same. Step 262 calculates W_SPD_CAL by dividing TG_SPD by W_SPD_NOM.

After W_SPD_CAL is calculated, CAL_FLAG is cleared at step 263 and SAM_CNT is set to 1 at step 264 before a return is made to the main program. W_SPD_CAL may be used in another routine to calculate values such as wheel slip for display.

If, during the process of taking 5 samples, a sampled value of TG_SPD or W_SPD_NOM is not equal to the first sample, the counting of consistent samples is restarted. A branch is made form step 256 or 257 to step 264 to reset SAM_CNT to 1. If the tractor speed drops below 10 mph, this is detected at step 254 and SAM_CNT is reset to 1 at step 264.

CAL_FLAG is cleared at step 263 immediately after W_SPD_CAL is calculated. Thus, on subsequent executions of the routine the test at step 253 proves false and SAM_CNT is not incremented. The only way to set CAL_FLAG is to allow the tractor speed to drop below 8 mph. This will be detected at step 252 and CAL_FLAG will be set at step 258.

From the foregoing description it is evident that the present invention provides a novel method and apparatus for accurately producing a slip control signal, the wheel speed signal from which the slip control signal is derived being modified by a correction factor which is continuously updated when no-slip conditions are present, and the slip signal being disabled entirely when the true ground speed sensor output signal does not truly represent the tractor ground speed. While preferred embodiments have been described in specific detail, it will be understood that various modifications and substitutions may be made in the described embodiments without departing from the spirit and scope of the invention as defined by the appended claims.

The invention in which an exclusive property or privilege is claimed is defined as follows.

We claim:

1. In a system having a hitch mounted on a tractor, means responsive to a position command for generating a position signal for positioning the hitch, modifier means for modifying the position signal in accordance with a degree of slip of the tractor wheels, slip signal generating means for generating a slip signal corresponding to the degree of wheel slip, the slip signal generating means including a sensor for sensing the rate of rotation of the tractor wheels, and a radar unit mounted at a side of the tractor for sensing true ground speed, the improvement comprising:

slip signal control means for selectively applying said slip signal to said modifier means, said slip signal control means including means for preventing application of the slip signal to the modifier means when the position command commands positioning of the hitch higher than a threshold height.

2. The improvement as claimed in claim 1 wherein the system includes an implement attached to the hitch and enable means for producing an enable signal when the implement engages the ground, said slip control means being responsive to said enable signal to apply the slip signal to the modifier means.

3. The improvement as claimed in claim 2 wherein said means for preventing application of the slip signal to the modifier means comprises comparator means for comparing an upper limit signal with said position command, two-state indicator means settable to one state in response to an output signal from the comparator means and settable to a second state in response to said enable means, and means responsive to said indicator means for applying the slip signal to the modifier means only when the indicator means is in said second state.

4. The improvement as claimed in claim 2 wherein the means for preventing application of the slip signal to the modifier means comprises means for inhibiting application of the slip signal to the modifier means from the time the position command commands positioning of the hitch higher than the threshold height until the time the enable signal is produced.

5. The improvement as claimed in claim 4 wherein said threshold height is less than an upper limit established by a signal generated in response to setting of a control element by a tractor operator.

6. In a system having a hitch mounted on a tractor and pulling an implement, means responsive to a position command for generating a position signal for positioning the hitch, modifier means for modifying the position signal in accordance with a degree of slip of the tractor wheels, slip signal generating means for generating a slip signal corresponding to the degree of wheel slip, the slip signal generating means including a sensor for sensing the rate of rotation of the tractor wheels and a sensor unit mounted at a side of the tractor for sensing true ground speed, a method of preventing modification of the position signal by the slip signal during intervals the tractor is being turned in the headlands of a field, said method comprising:

as the tractor approaches a headland, changing the position command to command raising the hitch above a threshold height, inhibiting application of the slip signal to the modifier means when the position command commands a hitch position above said threshold height;

as the tractor completes a turn, changing the position command to command lowering of the hitch;

determining when the implement engages the ground as the hitch is lowered; and, reapplying the slip control signal to the modifier means when it is determined that the implement has engaged the ground.

7. The method as claimed in claim 6 wherein the steps of changing the position command comprise moving a manually operable quadrant lever to change the position command.

8. The method as claimed in claim 6 wherein the step of determining when the implement engages the ground comprises sensing the draft on the hitch.

9. The method as claimed in claim 6 wherein the step of reapplying the slip control signal to the modifier means is carried out only after the implement has engaged the ground for a predetermined interval of time.

10. A method of automatically determining a correction signal for a wheel speed indication in a system having a sensor for sensing the true ground speed of a tractor and producing a first signal representative thereof and means for sensing the rate of rotation of the tractor wheels and producing a second signal indicating wheel speed, said tractor carrying a hitch having an implement attached thereto, said method comprising:

determining when the implement is out of engagement with the ground and the speed of the tractor is greater than a threshold speed; and, while the hitch is raised and the true ground speed of the tractor is greater than the threshold speed, dividing said first signal by said second signal to obtain a correction signal.

11. The method as claimed in claim 10 wherein the first signal is repeatedly divided by the second signal as long as the implement is out of engagement with the ground and the true ground speed is greater than said threshold speed so that said correction signal may vary with time, said method further comprising low pass filtering the correction signal.

12. The method as claimed in claim 11 wherein the step of low pass filtering comprises filtering the correction signal to remove frequencies above about 0.016 Hz.

13. The method as claimed in claim 11 and further comprising the step of storing the filtered correction signal for subsequent use.

14. A method as claimed in claim 10 wherein said first and second signals are sensed a plurality of times and the first signal is divided by the second signal only when said first and second signals each maintain a consistent magnitude each said plurality of time they are sensed.

15. A method as claimed in claim 14 wherein, after said correction signal is obtained, further division of said first signal by said second signal is prevented until the speed of the tractor drops below a second threshold speed and then increases again to be greater than said threshold speed.

16. An indicated wheel speed correction factor determining means for use with a tractor having a hitch thereon, means for producing an indicated wheel speed signal by sensing rotation of the rear axle of the tractor, and means producing a signal representing the true ground speed of the tractor, said indicated wheel speed correction factor determining means comprising:

divider means for dividing said true ground speed signal by said indicated wheel speed signal to produce a signal representing an indicated wheel speed correction factor; and, means automatically enabling said divider means when said hitch is raised above a threshold level and the signal representing true ground speed indicates that the tractor is traveling at grater than a threshold speed.

17. An indicated wheel speed correction factor determining means as claimed in claim 16 wherein said divider means repeatedly divides the true ground speed signal by the indicated wheel speed signal to develop successive signals representing the indicated wheel speed correction factor, and filter means for filtering said successive signals to obtain a filtered correction factor signal.

18. An indicated wheel speed correction factor determining means as claimed in claim 17 wherein said divider means and said filter means comprise a microprocessor.

19. An indicated wheel speed correction factor determining means as claimed in claim 17 and means for storing the filtered correction factor signal.

20. An indicated wheel speed correction factor determining means as claimed in claim 19 in combination with multiplier means for multiplying the indicating wheel speed signal by the stored filtered correction factor signals.

* * * * *